United States Patent [19]

Spivey

[11] Patent Number: 4,670,646

[45] Date of Patent: Jun. 2, 1987

[54] LASER WAVEFRONT MEASUREMENT DEVICE UTILIZING CROSSED RONCHI GRATINGS

[75] Inventor: Brett A. Spivey, Encinitas, Calif.

[73] Assignee: Western Research Corporation, San Diego, Calif.

[21] Appl. No.: 744,169

[22] Filed: Jun. 12, 1985

[51] Int. Cl.⁴ ............................................... G01J 1/10
[52] U.S. Cl. .................................. 250/201; 356/354; 356/121
[58] Field of Search ............................ 250/201, 237 G; 356/354, 121; 350/607

[56] References Cited

U.S. PATENT DOCUMENTS

| | | | |
|---|---|---|---|
| 4,231,662 | 11/1980 | Feirland et al. | 250/237 G |
| 4,273,446 | 6/1981 | Pohle | 356/354 |
| 4,309,602 | 1/1982 | Gonsalves et al. | 250/201 |
| 4,413,909 | 11/1983 | Pohle | 356/354 |

*Primary Examiner*—David C. Nelms
*Assistant Examiner*—Charles Wieland
*Attorney, Agent, or Firm*—Townsend and Townsend

[57] ABSTRACT

A wavefront, such as from a laser, is sampled, preferably at a beam splitter to break off only a fraction of the total light energy. The sampled beam is adjusted and sized—either by expansion or contraction at a conventional telescope—and thereafter sent through paired crossed Ronchi gratings and onto a CCD camera located at the first wave distance of constructive interference from the crossed Ronchi gratings. The crossed Ronchi gratings—in the order of 200 lines per inch and preferably with 200 equally spaced gaps per inch—project an array of square spots onto the focus of the CCD camera. The image of the array of square spots at the CCD camera is frozen via a frame grabber and digitized in a conventional format. The digitized image is played through a disclosed computer program to locate the spots. Thereafter, the located spots are compared to a standard spots. By knowing the difference between spot location of the standard spots and spot location of the suspect spots, wavefront analysis in phase can be analyzed. There results a simple wavefront analysis without the use of precision and moving optical parts which provides for measurement of the wavefront.

6 Claims, 4 Drawing Figures

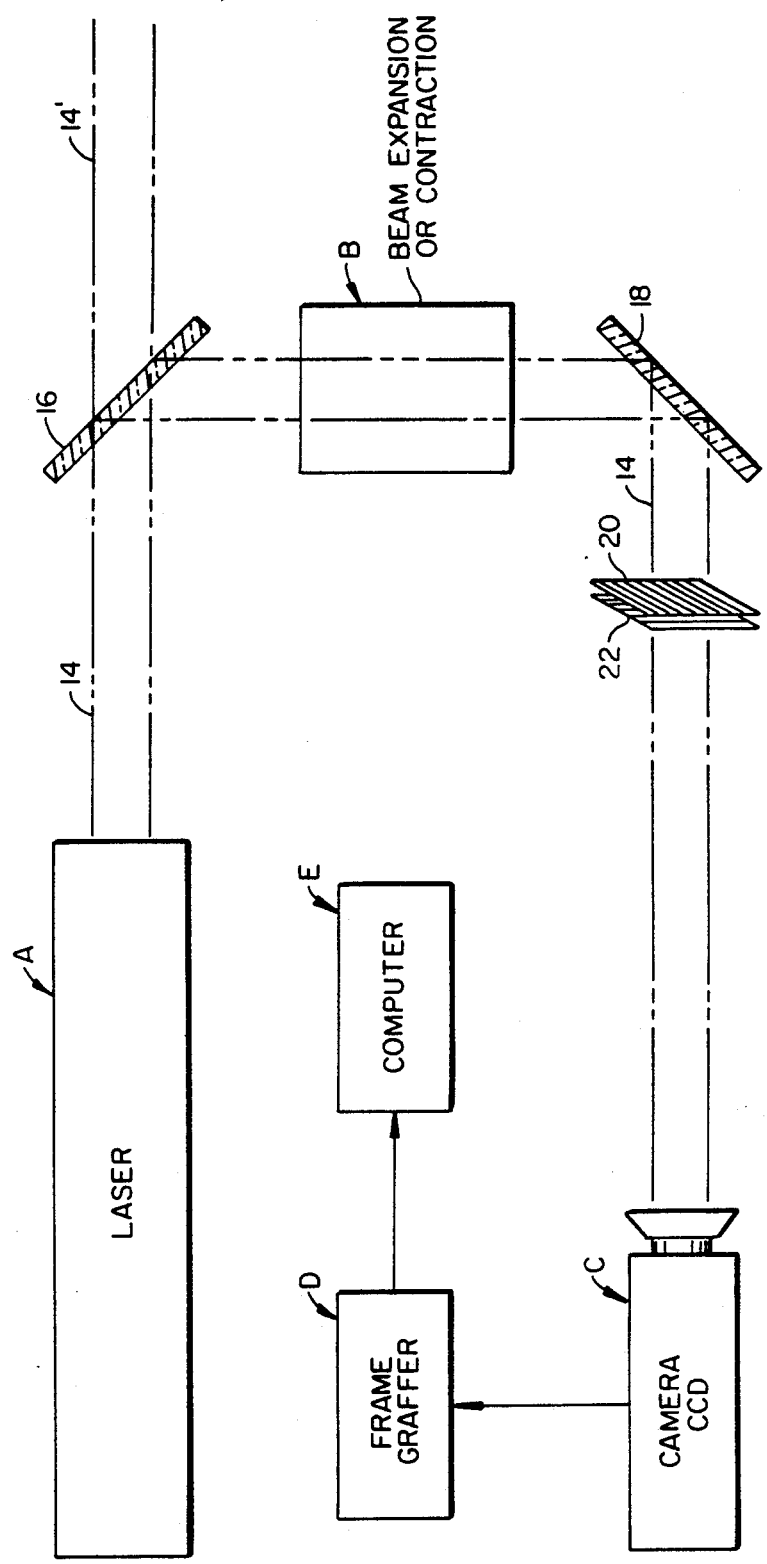
FIG._1.

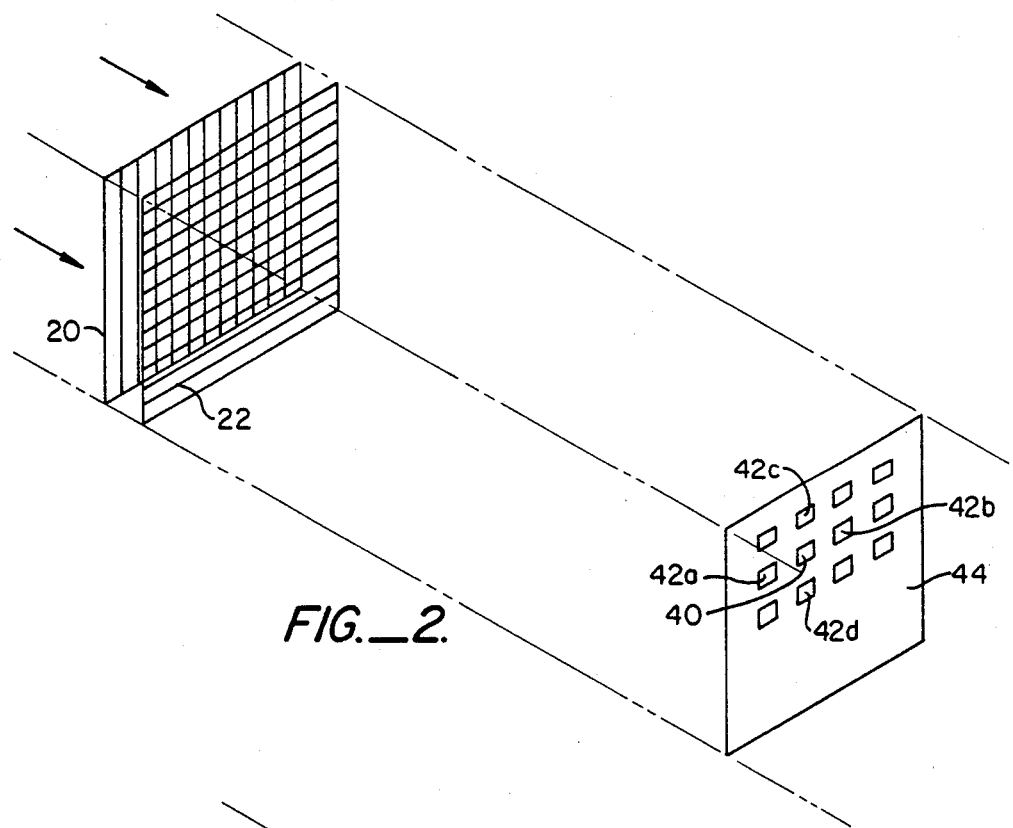
FIG._2.
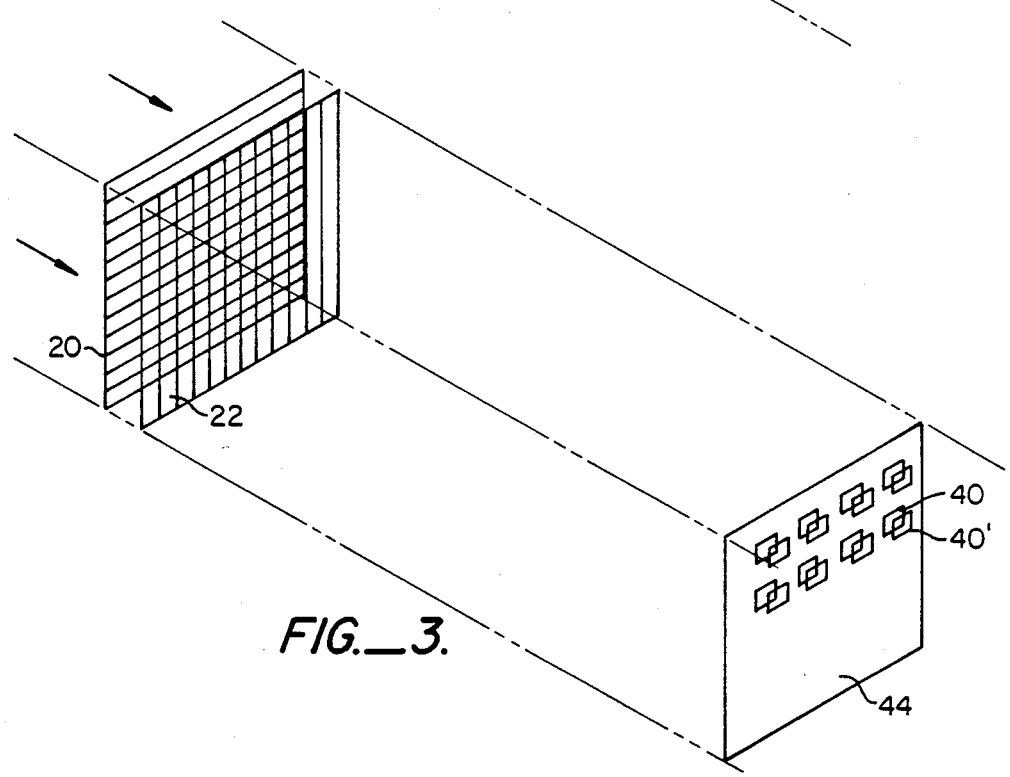
FIG._3.

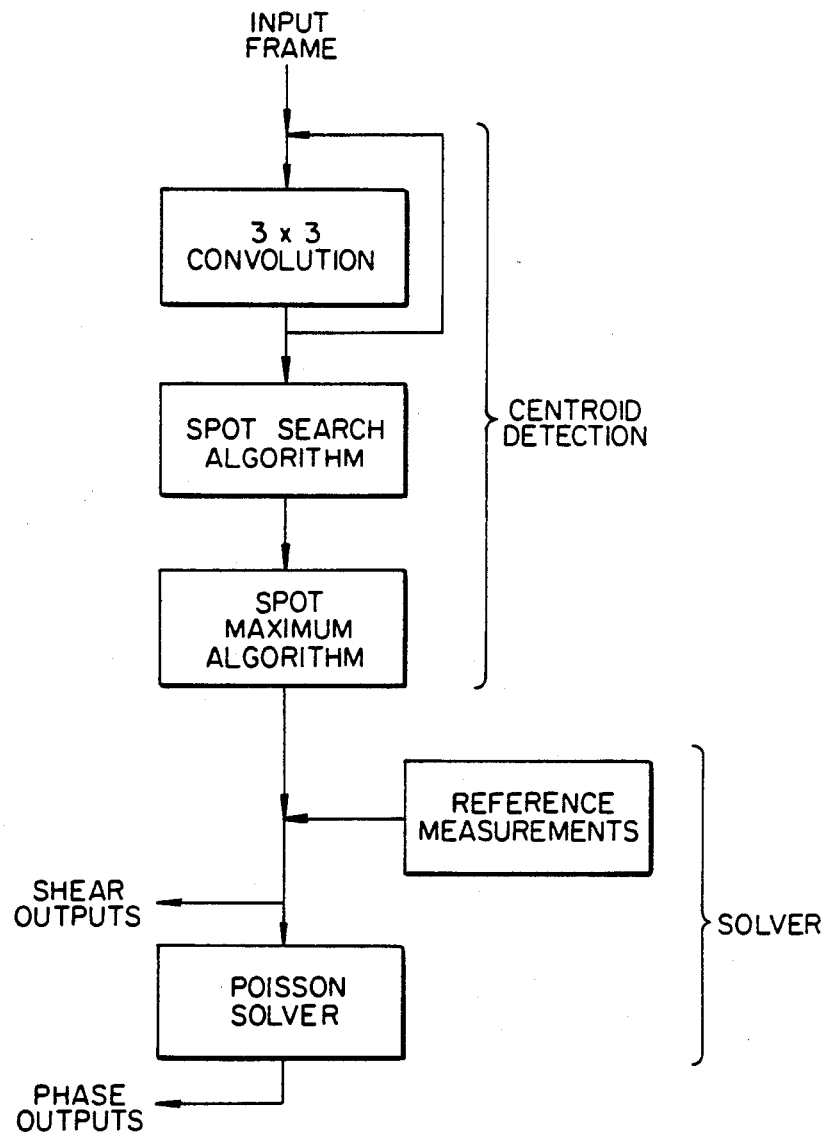
FIG._4.

LASER WAVEFRONT MEASUREMENT DEVICE UTILIZING CROSSED RONCHI GRATINGS

STATEMENT OF GOVERNMENT INTEREST

The invention described herein may be manufactured and used by or for the government for government purposes without the payment of royalty thereon.

BACKGROUND OF THE INVENTION

This invention relates to beam projectors and, more particularly, to a wavefront sampling system for checking the coherence of wavefronts, such as those emanating from a laser.

Summary of the Prior Art

Use of crossed Ronchi gratings for wavefront sampling is known. See, for example, Light Spot Position Sensor For A Wavefront Sampling System, U.S. Pat. No. 4,273,446 to Pohle, and assigned to the United States of America as represented by the Secretary of the Air Force.

This device focuses a sampled beam to a pupil and modulates the beam at the pupil with a moving Ronchi grating. The beam is reexpanded and sampled as modulated. Wavefront and phase are analyzed.

This scheme requires moving and precision optical parts in the rotating Ronchi grating. Moreover, the device is located in a telescope aligned as a beam expander.

SUMMARY OF THE INVENTION

A wavefront, such as from a laser, is sampled, preferably at a beam splitter to break off only a fraction of the total light energy. The sampled beam is adjusted and sized—either by expansion or contraction at a conventional telescope—and thereafter sent through paired crossed Ronchi gratings and onto a CCD camera located at the first wave distance of constructive interference from the crossed Ronchi gratings. The crossed Ronchi gratings—in the order of 200 lines per inch and preferably with 200 equally spaced gaps per inch—project an array of square spots onto the focus of the CCD camera. The image of the array of square spots at the CCD camera is frozen via a frame grabber and digitized in a conventional format. The digitized image is played through a disclosed computer program to locate the spots. Thereafter, the located spots are compared to a standard spots. By knowing the difference between spot location of the standard spots and spot location of the suspect spots, wavefront analysis in phase can be analyzed. There results a simple wavefront analysis without the use of precision and moving optical parts which provides for measurement of the wavefront.

Objects and Advantages of the Invention

An object of this invention is to disclose the simplified use of crossed Ronchi gratings for wavefront analysis. According to this aspect of the invention, crossed Ronchi gratings are placed normally to a collimated and essentially coherent beam. Preferably, at the plane of the first interference pattern, downstream from the grating, a CCD camera is placed. A frame grabber freezes the image of the interference pattern from the CCD camera. Thereafter, the image is digitized, analyzed for spot location, and thereafter has the analyzed spot location compared to reference location. By computation based on the compared locations, the wavefront's phase at the Ronchi gratings can be reconstructed.

An advantage of this invention is the wavefront is sampled on a broad basis. Either expanding optics or contracting optics can be used with the invention to analyze all sizes and shapes of beam output, especially those from large lasers.

A further advantage of this invention is that no moving precision optical parts are utilized.

BRIEF DESCRIPTION OF THE DRAWINGS

Other objects, features, and advantages of this invention will become more apparent after referring to the following specification and attached drawings in which:

FIG. 1 is a schematic view of the wavefront tester of this invention;

FIG. 2 is a schematic view showing the reference wavefront passing through crossed Ronchi gratings onto the film complain of a charged coupled camera;

FIG. 3 is a view similar to FIG. 2 illustrating in a first position the spots in the reference wavefront and in a second position suspect spots from the sampled wavefront moved because of phase differences at the Ronchi grating; and FIG. 4 is a block diagram of a computer program illustrating in flow chart form a program filed as a microfiche appendix to this application.

DETAILED DESCRIPTION OF THE PREFERRED EMBODIMENT

Referring to FIG. 1, a laser A is illustrated having an output beam 14, here a beam of high intensity. Beam 14 passes in large measures to beam 14' to downstream optics. A beam splitter 16 is shown located for diverting only a fraction of the light.

Beam splitter 16 typically diverts light through a beam expander or contractor. For example, a reversed Cassegrain telescope can be used to contract a large laser beam down to a smaller laser beam for analysis. After passing through a directing mirror 18, the laser beam 14 passes through paired Ronchi gratings 20, 22.

The crossed Ronchi gratings are mounted normal to the light path in back-to-back relationship with grating lines in preferred contact. Typically, these gratings are ruled on the order of 200 lines per inch. Preferably, each gratings has equal line width and equal gap width. The lines of the respective gratings are at right angles, one to another.

Thus, with 200 lines per inch, a downstream image of 40,000 squares is generated.

The squares are impinged upon a standard state of the art charge coupled device (CCD), such as a video camera. Typically, a portion of the 40,000 squares is sampled only, at the camera C.

The image from the camera C passes to a frame grabber D. The image is then stopped and passed to a computer E, where the image is further processed.

Referring to FIG. 4, a block diagram is illustrated. The block diagram illustrates the steps of the image being digitized (see Centroid Detection, FIG. 4) and thereafter passed to an aperture analysis program (see Solver, FIG. 4). It is the function of the aperture analysis program to numerically locate all squares of light produced by the crossed Ronchi gratings on the CCD device. Thereafter, the located light squares are compared to reference light squares for location. A phase analysis extending across the front of the sampled beam results.

I have caused to be listed hereto my program for translating the digitized image to yield the spot location. See section of FORTRAN program entitled Centroid Detect following.

I have also caused to be listed a program for comparing spot location for a reference beam with spot location for the sampled beam to determined overall wavefront. See section of FORTRAN program entitled SOLVER.

```
         PROGRAM CONV
         INTEGER RPIXEL,RNOW
         CALL SELGRP(1)
3        TYPE*,'FILTER K1,K2,K3,K4'
         ACCEPT*,K1,K2,K3,K4
         IF(K4.EQ.0) RETURN
         CALL CONVD(K1,K2,K3,K4)
8        TYPE*,'AGAIN=1'
         ACCEPT*,J
         IF(J.EQ.1) GO TO 3
         END

PROGRAM CENT
C
         CHARACTER*9,NAME1
         BYTE ISHP(60,60)
         INTEGER RPIXEL,RNOW,ITX(60,60),ITY(60,60)
         CALL SELGRP(1)
         TYPE*,'MIN STEP SIZE'
         ACCEPT*,MINST
         DO 2 I=1,60
         DO 2 J=1,60
2        ISHP(I,J)=0
         IP=31
         JP=30
         I=30
         J=30
         IXM=0
         IYM=0
         IX=256
         IY=240
3        CONTINUE
         I1=RPIXEL(IX,IY)
         I2=RPIXEL(IX+1,IY)
         IF(I2.LE.I1) GO TO 7
         IX=IX+1
         GO TO 3
7        I2=RPIXEL(IX-1,IY)
         IF(I2.LE.I1) GO TO 8
         IX=IX-1
         GO TO 3
8        I2=RPIXEL(IX,IY+1)
         IF(I2.LE.I1) GO TO 9
         IY=IY+1
9        I2=RPIXEL(IX,IY-1)
         IF(I2.LE.I1) GO TO 11
         IY=IY-1
         GO TO 3
11       CONTINUE
```

```
          ID=MINST
          ITX(I,J)=IX
          ITY(I,J)=IY
          ISHP(I,J)=1
          JN=J+I-IP

IN=I-J+JP
          IF(ISHP(IN,JN).EQ.0) THEN
                 INCX=-J+JP
                 ICNY=I-IP
                 IP=I
                 JP=J
                 I=IN
                 J=JN
          ELSE
                 IN=I+I-IP
                 JN=J+J-JP
                 IP=I
                 JP=J
                 I=IN
                 J=JN
          ENDIF
          IX=IX+ID*INCX
          IY=IY+ID*INCY
          IF(I.LT.1.OR.I.GT.60) GO TO 14
          IF(J.LT.1.OR.J.GT.60) GO TO 14
          GO TO 3
14        SUMX=0.
          SUMY=0.
          SUMXX=0.
          SUMYY=0.
          SUMXY=0.
          SUMYX=0.
          SUMIJ=0.
          SUMJJ=0.
          SUMII=0.
          SUMJ=0.
          SUMI=0.
          SUM0=0.
          DO 27 I=1,60
          DO 27 J=1,60
          IF(ISHP(I,J).EQ.0) GO TO 27
          SUMX=SUMX+FLOAT(ITX(I,J))
          SUMY=SUMY+FLOAT(ITY(I,J))
          SUMXX=SUMXX+I*FLOAT(ITX(I,J))
          SUMYY=SUMYY+J*FLOAT(ITY(I,J))
          SUMXY=SUMXY+J*FLOAT(ITX(I,J))
          SUMYX=SUMYX+I*FLOAT(ITY(I,J))
          SUMIJ=SUMIJ+FLOAT(I)*FLOAT(J)
          SUM0=SUM0+1.
          SUMI=SUMI+FLOAT(I)
          SUMJ=SUMJ+FLOAT(J)
          SUMII=SUMII+FLOAT(I)**2
          SUMJJ=SUMJJ+FLOAT(J)**2
27        CONTINUE
          DET=SUM0*SUMII*SUMJJ+2.*SUMI*SUMJ*SUMIJ-SUM0*SUMIJ**2
        &    -SUMII*SUMJ**2-SUMJJ*SUMI**2
```

```
        C1=(SUMII*SUMJJ-SUMIJ**2)
        C2=(SUMIJ*SUMJ-SUMI*SUMJJ)
        C3=(SUMI*SUMIJ-SUMII*SUMJ)
        C4=(SUM0*SUMJJ-SUMJ**2)
        C5=(SUMI*SUMJ-SUM0*SUMIJ)
        C6=(SUM0*SUMII-SUMI**2)
        BX=*C1*SUMX+C2*SUMXX+C3*SUMXY)/DET
        BY=*C1*SUMY+C2*SUMYY+C3*SUMYY)/DET
        AXX=(C2*SUMX+C4*SUMXX+C5*SUMXY)/DET
        AYX=(C2*SUMY+C4*SUMYX+C5*SUMYY)/DET
        AXY=(C3*SUMX+C5*SUMXX+C6*SUMXY)/DET
        AYY=(C3*SUMY+C5*SUMYX+C6*SUMYY)/DET
        TYPE*,DET,C1,C2,C3,C4,C5,C6
        TYPE*,BX,AXX,AXY
        TYPE*,BY,AYX,AYY
        DO 33 I=1,60
        DO 33 J=1,60
        IF(ISHP*I,J).EQ.0) GO TO 33
        ITXT=INT(ITX*I,J)-BX-AXY*J-AXX*I)
        ITYT=INT(ITY*I,J)-BY-AYX*J-AYY*I)
        CALL WPIZEL(ITXT+40,ITYT+40,255)
        IF(ITXT.LT.-INT(AYY).OR.ITYT.GT.INT(AYY))
       & .OR.ITYT.LT.-INT(AYY).OR.ITYT.GT.INT(AYY))
       & TYPE*,I,J,ITXT,ITYT
33      CONTINUE
        DO 41 I=1,60
        DO 41 J=1,60
        IF(ISHP(I,J).EQ.0) GO TO 41
        ITXP=ITX(I,J)
        ITYP=ITY(I,J)
        IP1=RPIXEL(ITXP+1,ITYP)
        IM1=RPIXEL(ITXP-1,ITYP)
        JP1=RPIXEL(ITXP,ITYP+1)
        JM1=RPIXEL(ITXP,ITYP-1)
        IPIX=RPIXEL(ITXP,ITYP)
        CALL WPIXEL(ITXP,ITYP,255)
        ITX(I,J)=ITXP*64+(64*IP1-64*IM1)/(4*IPIX-2*IP1-2*IM1)
        ITY(I,J)=ITYP*64+(64*JP1-64*JM1)/(4*IPIX-2*JP1-2*JM1)
41      CONTINUE
        TYPE*,'FILENAME.DATA, 9 CHAR.'
        ACCEPT*,NAME1
        OPEN(3,FILE=NAME1,STATUS='UNKNOWN',BLOCKSIZE=512,
       & FORM='UNFORMATTED',ACCESS='SEQUENTIAL')
        DO 21 I=1,60
21      WRITE(3) (ITX(I,J),ITY(I,J),ISHP(I,J),J=1,60)
        CLOSE(3)
        END

PROGRAM SLVR

BYTE ISHP(60,60),ISHP1(60),ISHP2(60)
        CHARACTER*9 NAME1,NAME2
        INTEGER ITX1(60),ITX2(60),ITY1(60),ITY2(60)
        INTEGER RPIXEL,RNOW,ITX(60,60),ITY(60,60),IPH(60,60)

C              SOLVER ROUTINE
```

```
C              IPH(I+1,J)-IPH(I,J)=(ITX(I,J)+ITX(I+1,J))/2

CALL SELGRP(1)
       TYPE*,'FILENAME.DAT FOR CALIBRATION'
       ACCEPT*,NAME1
       OPEN(3,FILE=NAME1,STATUS='OLD',FORM='UNFORMATTED',
      & BLOCKSIZE=512)
       TYPE*,'FILENAME.DAT FOR ANALYSIS'
       ACCEPT*,NAME2
       OPEN(4,FILE=NAME2,STATUS='OLD',FORM='UNFORMATTED',
      & BLOCKSIZE=512)
       SUMX=0.
       SUMY=0.
       SUM0=0.
       DO 7 I=1,60
       READ(3) (ITX1(J),ITY1(J),ISHP1(J),J=1,60)
       READ(4) (ITX2(J),ITY2(J),ISHP2(J),J=1,60)
       DO 7 J=1,60
       ITX(I,J)=ITX2(J)-ITX1(J)
       ITY(I,J)=ITY2(J)-ITY1(J)
       ISHP(I,J)=ISHP1(J)*ISHP2(J)
       IF(ISHP(I,J).EQ.0) GO TO 7
       SUMX=SUMX+ITX(I,J)
       SUMY=SUMY+ITY(I,J)
       SUM0=SUM0+1
     7 CONTINUE
       CLOSE(3)
       CLOSE(4)
       DO 53 I=1,60
       DO 53 J=1,60
       IPH(I,J)=0
       ITX(I,J)=ITX(I,J)-INT(SUMX/SUM0+.5)
       ITY(I,J)=ITY(I,J)-INT(SUMY/SUM0+.5)
       IF(I.EQ.1.OR.I.EQ.60.OR.J.EQ.1.OR.J.EQ.60) ISHP(I,J)=0
    53 CONTINUE
    52 WRITE(5,*)'LOOP GAIN'
       READ(5,*),ALPHA
       WRITE(5,*)'? ITER.'
       READ(5,*),NIT
       IF(NIT.EQ.0) STOP
       DO 56 N=1,NIT
       AMAX=0.
       DO 55 I=2,59
       DO 55 J=2,59
       K1=ISHP(I-1,J)+ISHP(I+1,J)+ISHP(I,J-1)+ISHP(I,J+1)
       IF(K1.EQ.0) GO TO 55
       IF(ISHP(I,J).EQ.0) GO TO 55
       K2=(2*IPH(I+1,J)-ITX(I,J)-ITX(I+1,J))*ISHP(I+1,J)
       K3=(2*IPH(I-1,J)+ITX(I,J)+ITX(I-1,J))*ISHP(I-1,J)
       K4=(2*IPH(I,J+1)-ITY(I,J)-ITY(I,J+1))*ISHP(I,J+1)
       K5=(2*IPH(I,J-1)+ITY(I,J)+ITY(I,J-1))*ISHP(I,J-1)
       R1=.5*FLOAT(K2+K3+K4+K5)/FLOAT(K1)
       R2=R1-IPH(I,J)
       IF(ABS(R2).GT.AMAX) AMAX=ABS(R2)
       IPH(I,J)=IPH(I,J)+INT(.5+R2*ALPHA)
```

```
      CALL WPIXEL(I,J,IPH(I,J)+128)
      CALL WPIXEL(I,J+60,INT(R2)*64+128)
55    CONTINUE
      WRITE(5,*),AMAX
56    CONTINUE
      GO TO 52
      END
```

Besides the appended disclosing computer programs, I include herewith a list of the mathematical equations necessary for analyzing spot migration due to wavefront differences.

The numerical methods involved in processing the raw camera data fall into two categories: centroid detection and solver.

The centroid detection algorithm uses a process of convolution of the spots with a Gaussian kernal followed by a maximum search. This can be described by the following equations:

$$\vec{c} = \underset{x,y}{\mathrm{Max}}\, (S(x,y) * K(x,y))$$

where c is the x,y coordinates of the centroid;
    S is the spot intensity profile; and
    K is the Gaussian kernal.

This can be reexpressed, using the properties of convolution, as $$S(\vec{c}) * \left| \frac{d}{dx} K(\vec{c}) \right| = 0$$

$$S(\vec{c}) * \left| \frac{d}{dy} K(\vec{c}) \right| = 0$$

These derivatives of the Gaussian kernal produce kernals which behave linearly near the origin and converge back to zero away from the origin. This is exactly what is needed for centroid detection of a centralized region, such as each of the detected spots.

Besides the appended disclosing computer programs, I include herewith a list of the mathematical equations necessary for analyzing spot migration due to wavefront differences.

The numerical methods involved in processing the raw camera data fall into two categories: centroid detection and solver.

The centroid detection algorithm uses a process of convolution of the spots with a Gaussian kernal followed by a maximum search. This can be described by the following equations:

$$\vec{c} = \underset{x,y}{\text{Max}} (S(x,y) * K(x,y))$$

where

C is the x,y coordinates of the centroid;
S is the spot intensity profile; and
K is the Gaussian kernal.

This can be reexpressed, using the properties of convolution, as $$S(\vec{c}) * \left| \frac{d}{dx} K(\vec{c}) \right| = 0$$

$$S(\vec{c}) * \left| \frac{d}{dy} K(\vec{c}) \right| = 0$$

These derivatives of the Gaussian kernal produce kernals which behave linearly near the origin and converge back to zero away from the origin. This is exactly what is needed for centroid detection of a centralized region, such as each of the detected spots.

The Gaussian convolution is carried out in a computationally efficient manner by performing a series of 3×3 convolutions. By the central limit theorem, these 3×3 convolutions combine to produce a Gaussian convolution. The number of these smaller convolutions determines the radius of the Gaussian convolution.

After the convolution, I perform a spot search algorithm by examining the four pixels adjacent to a given pixel. If one of these four is larger than the original pixel, the search is moved to the larger pixel and the process is repeated. If a pixel is larger than its four neighbors, a local maximum has been found and the spot maximum is calculated.

The spot maximum is calculated by performing a parabolic fit to the local maximum pixel and its four neighbors. The equations for this are:

$$C = C_0 + (I_1 - I_{-1})/(4I_0 - 2I_1 - 2I_{-1})$$

where

C is the centroid coordinate;
$C_0$ is the local maximum coordinate;
$I_0$ is the local maximum intensity;
$I_1$ is the intensity at the next pixel; and
$I_{-1}$ is the intensity of the previous pixel.

The spot centroids are then compared to a reference array to determine spot wander. This wander is related to wavefront tilt in the following manner:

$$\theta_T = c \cdot P/d$$

where $\theta_T$ is the x and y wavefront title;
c is the spot centroid deviation;
P is the CCD pixel spacing; and
d is the distance from the CCD array to the Ronchi grating.

The wavefront phase can be reconstructed from these wavefront tilts by solving the following equation (Poisson's equation):

$$\nabla^2 \phi = \frac{2\pi}{\lambda} \vec{\nabla} \cdot \vec{\theta}_T$$

where $\phi$ is the wavefront phase;
$\lambda$ is the light wavelength; and
$\theta_T$ is the wavefront tilt.

I solve a discrete form of this equation to obtain a phase at each of the spot locations.

Those having skill of the art will be able to take the equations disclosed and write their own software. However, out of an abundance of caution, I have caused to be filed herewith my software solution written in FORTRAN.

It is preferred that the crossed Ronchi gratings 20, 22 be at the first place of constructive interference downstream from the crossed Ronchi gratings. Accordingly the distance between the focal plane of the CCD camera and the crossed Ronci gratings is shown preferred in this aspect.

Those having skill in the art will realize that as the focal plane of the CCD camera is moved to successively remote planes of constructive interference two effects will occur.

First, the further downstream the camera is placed, the more the migration of the produced spots. This increased migration will give a higher lever arm and thus, without other competing effects, would be able to give more precision to the measurement obtained.

However, it will also be realized that as the distance from the respective gratings increases, the number of apertures contributing to each image will also increase. This increase in apertures contributing to each constructive image will decrease the sensitivity and focus of the resultant images being formed by constructive interference. This being the case, much resolution will be lost.

Reference can now be made to first FIG. 2. and, thereafter, FIG. 3, to determine how the invention herein disclosed operates.

Referring to FIG. 2, paired Ronchi gratings 20, 22 are illustrated. The plates 20, 22 are placed at back-to-back relationship and have 200 lines per inch, with the line width and gap width being equal spatial interval.

Taking a central spot 40 on the plane of the charge coupled camera 44, it will be remembered using constructive light interference, that image 40 will be a product at at least five upstream apertures of the crossed gratings.

Using the images of the gratings as they are projected onto frame 44, it will be remembered that the adjacent apertures 42A and 42B, 42C and 42D, all will have a part in constructive interference at aperture 40. In other words, the constructively produced image 40 will be a product of light produced from at least five upstream apertures.

It will be remembered that the focal plane 44 is placed at the first position of constructive interference. Should this focal plane be moved downstream the successive images 40 will have increased in number the apertures contributing to their appearance.

This will cause a loss of resolution of the spot 40, which loss of resolution will degrade the performance of the device. Accordingly, I prefer to place plane 44 at the first portion of wave interference.

Referring to FIG. 3, gratings 20, 22 are shown impinging upon the film plane of the charge coupled camera 44. Here, however, we have two sets of images 40.

The first image 40 was that produced by a standard. An in focus laser beam with a known front was passed through the optical path and the crossed Ronchi gratings and placed onto the camera.

Secondly, a sampled image 40' was passed through the Ronchi grating. This sampled image 40' had a differing phase (and/or direction) and, accordingly, migrated as it impinged upon screen 44. Simply stated, the differing phase (or direction) caused the beam on film plane 44 to move downwardly.

It will be appreciated that although essentially uniform movement of the spot 40' is shown on the diagram, such movement will not be uniform across a broadly sampled wavefront. In fact, portions of the image will be moved in differing directions and will thereafter have to be processed.

Having set forth my invention thus far, it will be realized that the disclosed device is uniquely suited to the steps of digitizing the resultant image; translating the digitized portion of the image to determine spot location; and thereafter comparing migrant spot location of a sampled beam with spot location of a reference beam to get a phase measurement. The steps relating to this aspect of the invention will now be outlined.

What is claimed is:

1. Apparatus for the sampling of a wavefront from a laser comprising in combination:
   means for diverting at least a portion of the light emanating from a laser to a measurement path having said diverted light not focused;
   first and second Ronchi gratings having their respective rulings crossed placed normal to said measurement path for receiving said diverted portion of the light emanating from a laser beam; and
   an imaging device placed at least a point of constructive interference from said Ronchi gratings for impinging thereupon spots of light through said Ronchi gratings whereby measurements of said spots of light result in the wavefront analysis of said beam.

2. Apparatus for the sampling of a wavefront from a laser comprising in combination:
   wherein said imaging device is placed at least at the first point of constructive interference from said Ronchi gratings.

3. A process of measuring a sampled laser beam for determining simultaneity of phase emission across said beam, said process comprising the steps of:
   sampling a portion of said laser beam with said sampled portion of said laser beam not being focused;
   diverting said sampled portion through first and second Ronchi gratings having their respective ruling crossed, said Ronchi gratings disposed normally to the path of said sampled beam to produce successive planes of constructive interference of said Ronchi gratings;
   photographing one of the planes of constructive interference to record spots of constructive interference;
   comparing the photographed spots of constructive interference with a standard spots of constructive interference for a reference beam; and
   determining the difference in location of said spots of constructive interference of said sampled beam with said spots of constructive interference of said reference beam to obtain a measure of phase difference between said respective beams.

4. The process of claim 2 wherein said photographing step includes photographing the first plane of constructive interference.

5. Apparatus for sampling of a wavefront from a laser comprising in combination:
   means for diverting at least a portion of the light emanating from said laser to a measurement path, said diverted portion of said laser beam not being focused;
   first and second Ronchi gratings placed normal to said measurement path for receiving said diverted laser beam;
   an imaging device placed at a point of constructive interference from said Ronchi grating for imaging thereupon spots of light through said Ronchi gratings whereby measurements of said spots of light occur at said image measurement device;
   memory means for retaining images of spots of light from a reference beam; and
   means for comparing spots of light from said reference beam to said measured beam whereby wavefront analysis of said beam can occur.

6. A process of measuring a suspect laser beam for determining simultaneity of phase emission across said beam with respect to a reference laser beam, said process comprising the steps of:

sampling a portion of a reference laser beam, said sampled portion of said reference laser beam not being focused;
   diverting said reference beam through first and second intersected Ronchi gratings disposed normally to the path of said sample beam to produce successive planes of constructive interference of said crossed Ronchi gratings;
   photographing one of the planes of constructive interference of said sample beam to produce a first set of spots of constructive interference from said intersected Ronchi gratings;
   sampling a portion of a suspect beam, said sampled portion of said suspect beam not being focused;
   diverting said sample portion of said suspect beam through the same first and second intersected Ronchi gratings disposed normally to the path of said sample beam to produce successive planes of constructive interference of said crossed Ronchi ratings from said sample beam;
   photographing the same plane of constructive interference of said sample beam as has been photographed of said reference beam to produce a second set of spots of constructive interference from said intersected Ronchi gratings;
   comparing the photographed plane of the reference beam to the sample beam; and
   determining movement of said first set of spots relative to said second set of spots of said sample beam with respect to said reference beam to obtain a measure of phase difference between said respective beams.

* * * * *